US009857967B2

(12) United States Patent
Shen

(10) Patent No.: US 9,857,967 B2
(45) Date of Patent: Jan. 2, 2018

(54) METHOD FOR SHOWING PAGE FLIP EFFECT OF TOUCH PANEL AND DISPLAY DEVICE WITH PAGE FLIP FUNCTION

(71) Applicant: PEGATRON CORPORATION, Taipei (TW)

(72) Inventor: Szu-Ju Shen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 232 days.

(21) Appl. No.: 14/695,034

(22) Filed: Apr. 23, 2015

(65) Prior Publication Data
US 2015/0324081 A1 Nov. 12, 2015

(30) Foreign Application Priority Data
May 8, 2014 (TW) .............................. 103116439 A

(51) Int. Cl.
G06F 3/048 (2013.01)
G06F 3/0486 (2013.01)
G06F 3/0481 (2013.01)
G06F 3/0488 (2013.01)

(52) U.S. Cl.
CPC .......... G06F 3/0486 (2013.01); G06F 3/0481 (2013.01); G06F 3/04883 (2013.01); G06F 3/04886 (2013.01); G06F 2203/04808 (2013.01)

(58) Field of Classification Search
CPC ..... G06F 3/0488; G06F 3/041; G06F 3/04883
See application file for complete search history.

(56) References Cited

U.S. PATENT DOCUMENTS

| 2007/0236478 | A1 | 10/2007 | Geaghan | |
|---|---|---|---|---|
| 2011/0055773 | A1* | 3/2011 | Agarawala | G06F 3/016 715/863 |
| 2013/0021281 | A1* | 1/2013 | Tse | G06F 3/0425 345/173 |
| 2013/0111395 | A1* | 5/2013 | Ying | G06F 3/0483 715/783 |
| 2013/0120294 | A1* | 5/2013 | Sun | G06F 3/041 345/173 |

(Continued)

FOREIGN PATENT DOCUMENTS

| CN | 102830819 A | 12/2012 |
|---|---|---|
| CN | 103309573 A | 9/2013 |
| TW | 201237725 | 9/2012 |

Primary Examiner — William Bashore
Assistant Examiner — Rayeez Chowdhury
(74) Attorney, Agent, or Firm — Winston Hsu

(57) ABSTRACT

A method for showing page flip effect of touch panel comprises detecting a two-point touch event generated at the touch panel for defining a first touch position and a second touch position. The touch panel is determined into a first active area comprising the second touch position and a second active area comprising the first touch position according to the first touch position and the second touch position. When the first touch position continuously locates at the touch panel, the second touch position disappears and the first touch event is generated at the first active area, a corresponding first page flip event is executed. When the second touch position continuously locates at the touch panel, the first touch position disappears and the second touch event is generated at the second active area, a corresponding second page flip event is executed.

16 Claims, 4 Drawing Sheets

(56) References Cited

U.S. PATENT DOCUMENTS

2014/0062914 A1 3/2014 Lin
2014/0362016 A1* 12/2014 Matsuki .................. G06F 3/041
 345/173
2014/0380247 A1* 12/2014 Tecarro ................. G06F 3/0483
 715/863
2015/0242074 A1* 8/2015 Iwamoto ............... G06F 3/0483
 345/158

\* cited by examiner

METHOD FOR SHOWING PAGE FLIP EFFECT OF TOUCH PANEL AND DISPLAY DEVICE WITH PAGE FLIP FUNCTION

CROSS-REFERENCE TO RELATED APPLICATIONS

This application claims the priority benefits of Taiwan Patent Application No. 103116439, filed on May 8, 2014. The entirety of the above-mentioned patent applications are hereby incorporated by references herein and made a part of specification.

BACKGROUND

Technology Field

This disclosure relates to a display device and, more particularly, to a display device with page flip function.

Description of the Related Art

Electronic devices with a touch panel have been applied extensively and are essential in daily life. The touch panels of the electronic devices, such as a smart phone, a personal digital assistant (PDA), a tablet, an electronic book and so on, can receive touch signals. Therefore, users only need to use their finger to input at the touch panel by utilizing a single click, a double click or a drag for operating all functions of the electronic device. In addition to the reception of a single point of the touch signal, the touch panels of many electronic devices can support multi-touch function. For example, the operating system (iOS6 or higher) of the smart phone provided by Apple Inc. (I-phone) has built-in application of utilizing four-point touch to turn on/off multiplex or built-in function of utilizing two fingers to drag simultaneously for selecting a row of folders or files. Thus, the touch panel combining single-touch and multi-touch does not only support an original touch command but also the user can customize different combination of touch signals for expanding the functions of the touch panel.

A page flip-up action or a page flip-down action is often executed when the user browses the websites, books or pictures by using the touch panel. However, using the multi-touch function of the touch panel cannot support the conventional page flip-up action or page flip-down action. Therefore, it frequently needs to find out a corresponding page flip button in application and then the user clicks the page flip button of the application trough the touch panel to change page. For example, if Internet Explorer (IE) browser is used, the user needs to click the button on the top left corner on the window for changing the web page (previous page or next page). If Google Chrome browser is used, the user needs to display the page flip button on the browser at first through the setting options of the browser and then click the page flip button for changing the web page. Different applications have different page flip buttons, and each of the page flip buttons has different positions. Therefore, the user needs to remember each of the positions of the page flip buttons corresponding to the applications for executing the page flip action. Because there is no united method for showing page flip effect of the touch panel, the users will not be able to change page when they forget the position of the page flip button and it will be less convenient for reading. Accordingly, designed a united and convenient method for showing page flip effect of the touch panel is very important.

BRIEF SUMMARY

An aspect of the present invention is to provide a method for showing page flip effect of touch panel. The method for showing page flip effect of the touch panel comprises detecting a two-point touch event generated at the touch panel for defining a first touch position and a second touch position; determining a first active area and a second active area of the touch panel according to a relative position of the first touch position and the second touch position, in which the first touch position is located within the second active area and the second touch position is located within the first active area; detecting whether a first touch event is generated within the first active area or not when the first touch position continuously locates at the touch panel and the second touch position disappears, and executing a corresponding first page flip event at the first active area according to the first touch event; and detecting whether a second touch event is generated within the second active area or not when the second touch position continuously locates at the touch panel and the first touch position disappears, and executing a corresponding second page flip event at the second active area according to the second touch event.

Another aspect of the present invention is to provide a touch display device. The touch display device comprises a touch panel, a processor and a storage. The touch panel is provided to detect a two-point touch event generated at the touch panel for defining a first touch position and a second touch position, to detect a first touch event and a second touch event generated at the touch panel, and further, to determine the touch panel into a first active area and a second active area according to a relative position of the first touch position and the second touch position when the first touch position and the second touch position are both located at the touch panel, in which the first touch position is located within the second active area and the second touch position is located within the first active area. The processor is coupled with the touch panel. When the first touch position continuously locates at the touch panel and the second touch position disappears, the touch panel detects whether the first touch event is generated within the first active area or not and the processor executes a corresponding first page flip event at the first active area according to the first touch event. When the second touch position continuously locates at the touch panel and the first touch position disappears, the touch panel detects whether the second touch event is generated within the second active area or not and the processor executes a corresponding second page flip event at the second active area according to the second touch event. The storage is coupled with the processor and provided for storing the first page flip event and the second page flip event.

DETAILED DESCRIPTION

Figure 1:
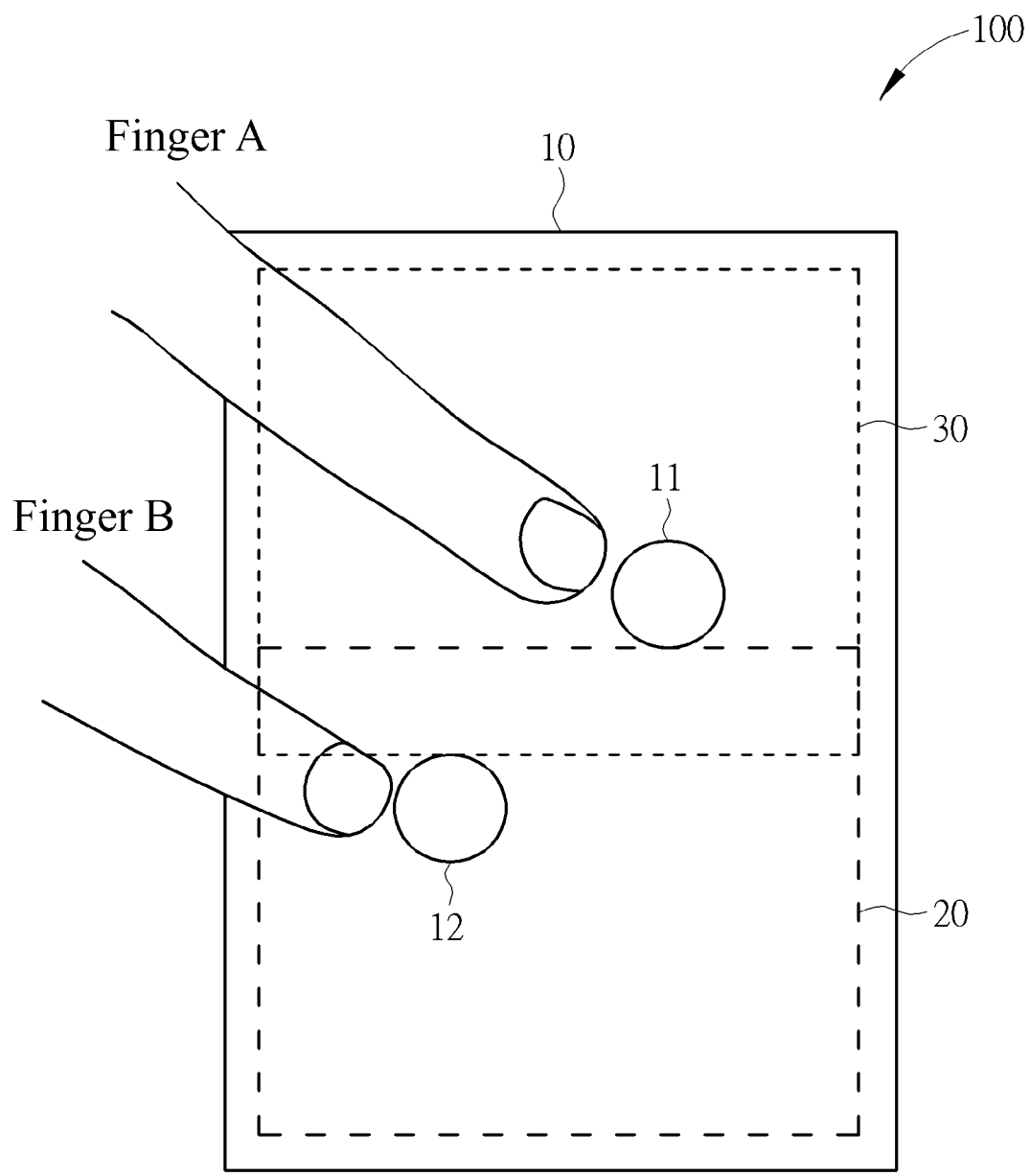
FIG. 1 is a schematic view showing an initial condition of a method for showing page flip effect of touch panel according to an embodiment of the present invention.

Please refer to FIG. 1. FIG. 1 is a schematic view showing an initial condition of a method for showing page flip effect of a touch panel according to an embodiment of the present invention. The initial condition described herein is a prerequisite condition which the method for showing page flip effect of the touch panel 100 does not change pages. Each of elements and symbols shown in FIG. 1 is described as follows. A touch panel 10 is a panel with display function and touch control function, such as a touch panel of a smart phone, a personal digital assistant (PDA), a tablet, an electronic book and so on. A first touch position 11 and a second touch position 12 are defined by a two-point touch event generated at the touch panel 10, such as the touch input which utilizes two fingers or two styluses to contact, respectively or simultaneously, the first touch position 11 and the second touch position. A first active area 20 is a detection range generated corresponding to the first touch position 11. A second active area 30 is a detection range generated corresponding to the second touch position 12. The operation of the initial condition of the method for showing page flip effect of the touch panel 100 according to the present invention will be illustrated as follows.

It supposes that the user uses two fingers (please refer to FIG. 1, a finger A and a finger B are supposed herein) to contact, respectively or simultaneously, the touch panel 10. A contact point of the finger A is generated at the touch panel 10, that is, the first touch position 11. A contact point of the finger B is generated at the touch panel 10, that is, the second touch position 12. Both the first touch position 11 and the second touch position 12 are located at the touch panel 10 thus to generate the two-point touch event. At that time, the touch panel 10 will determine a relative position of the first touch position 11 and the second touch position 12 (In the present embodiment, the first touch position 11 is above the second touch position 12) and calculate, respectively, the first active area 20 and the second active area 30 corresponding to the first touch position 11 and the second touch position 12. For the present embodiment, in which the first touch position 11 is above the second touch position 12, the first active area 20 is a dashed line area shown in FIG. 1. A method of determining the first active area 20 is to base on a coordinate of the first touch position 11 to select all planar range below the coordinate of the first touch position 11. In FIG. 1, the first active area 20 will comprise a coordinate of the second touch position 12 because the second touch position 12 is located below the first touch position 11. And then, the second active area 30 is a dotted line area shown in FIG. 1. A method of determining the second active area 30 is to base on the coordinate of the second touch position 12 to select all planar range above the coordinate of the second touch position 12. In FIG. 1, the second active area 30 will comprise the coordinate of the first touch position 11 because the first touch position 11 is located above the second touch position 12. On the contrary, when the first touch position 11 is located below the second touch position 12, all planar range above the coordinate of the first touch position 11 will be selected as the first active area 20 and all planar range below the coordinate of the second touch position 12 will be selected as the second active area 30. That is the setting of the initial condition of the method for showing page flip effect of the touch panel 100, and the operation of the method for showing page flip effect of the touch panel will be described in details as the following.

Figure 2:
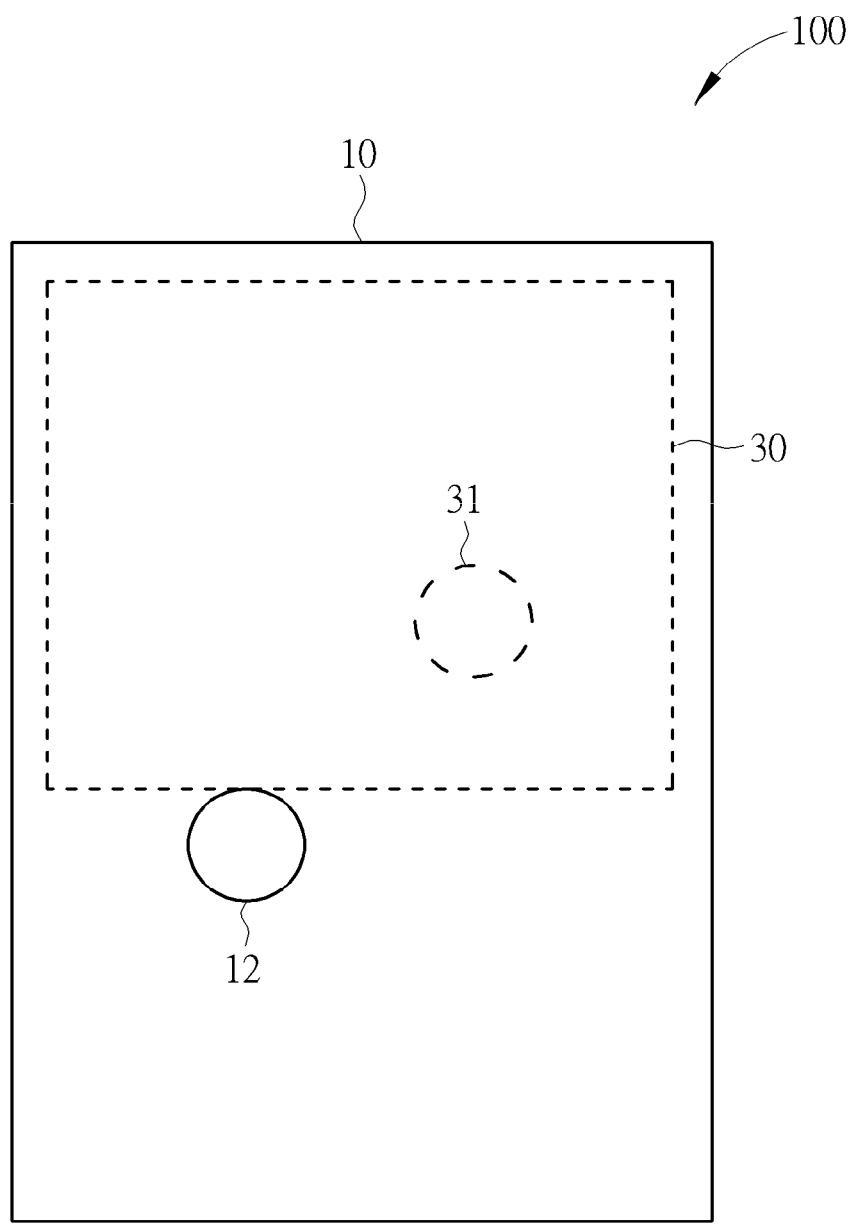
FIG. 2 is a schematic view showing a second page flip event of a method for showing page flip effect of touch panel according to an embodiment of the present invention.

Please refer to FIG. 2. FIG. 2 is a schematic view showing a second page flip event of a method for showing page flip effect of touch panel according to an embodiment of the present invention. The finger A and the finger B generate, respectively or simultaneously, the first touch position 11 and the second touch position 12 at the touch panel 10, and the first touch position 11 and the second touch position 12 are both located at the touch panel 10 thus to generate the two-point touch event. The embodiment of FIG. 1 is continued herein for conveniently understanding the process of the second page flip event. When the user moves away the finger A, which originally contacts the touch panel 10 together with the finger B, the contact point of the touch panel 10 will become a single-point touch (that is, the second touch position 12 continuously locates at the touch panel 10 and the first touch position 11 disappears) from the originally two-point touch (including the first touch position 11 corresponding to the finger A and the second touch position 12 corresponding to the finger B). At that time, the touch panel 10 detects whether the second touch event is generated within the second active area 30 or not. The user can use the finger A, which has moved away, to re-contact the touch panel 10 at a touch position 31 to allow the touch panel 10 to receive the second touch event at the touch position 31. If the touch position 31, where the second touch event locates, is located within the second active area 30, the touch panel 10 will display the second page flip event. It needs to illustrate herein that the touch position 31 in FIG. 2 is capable of being any coordinate within the second active area 30 and is not limited to the coordinate shown in FIG. 2.

Figure 3:
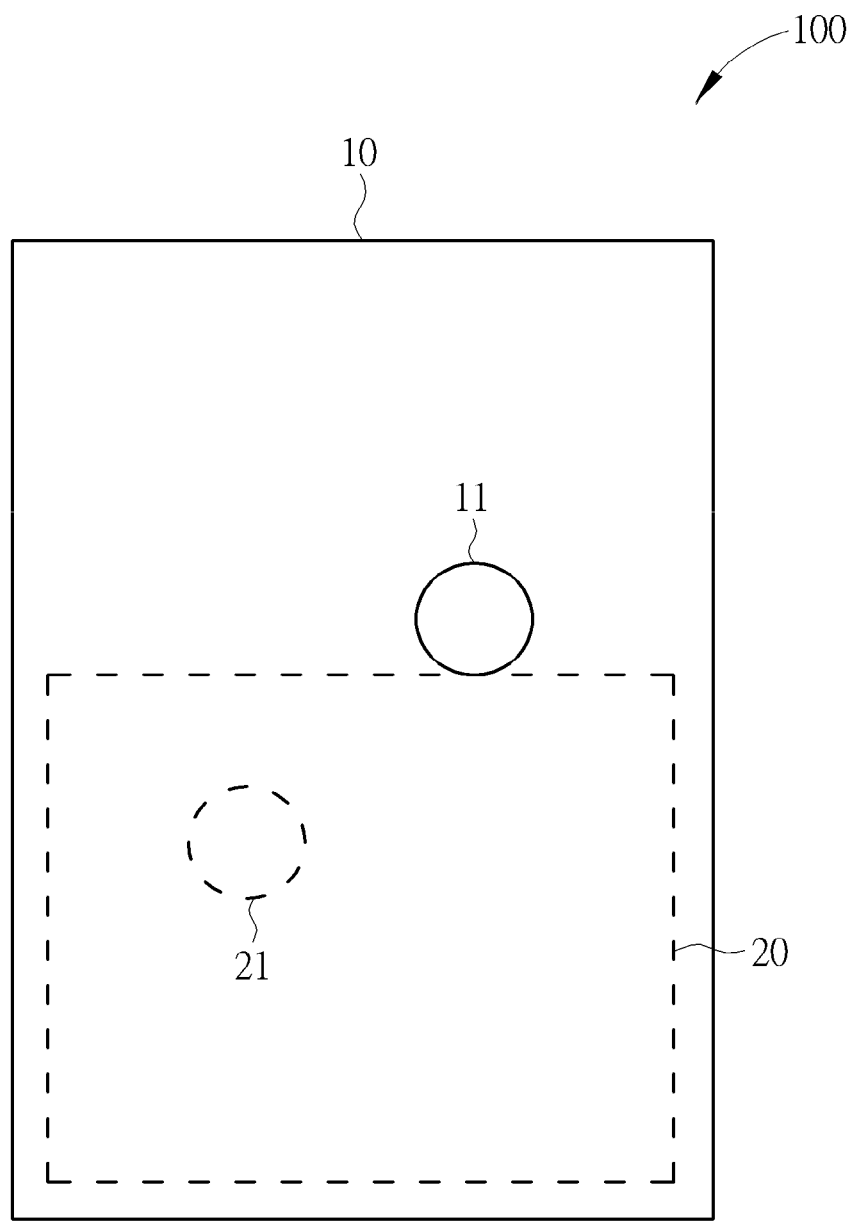
FIG. 3 is a schematic view showing a first page flip event of a method for showing page flip effect of touch panel according to an embodiment of the present invention.

Please refer to FIG. 3. FIG. 3 is a schematic view showing a first page flip event of a method for showing page flip effect of touch panel according to an embodiment of the present invention. The finger A and the finger B generate, respectively or simultaneously, the first touch position 11 and the second touch position 12 at the touch panel 10, and the first touch position 11 and the second touch position 12 are both located at the touch panel 10 thus to generate the two-point touch event. The embodiment of FIG. 1 is continued herein for conveniently understanding the process of the second page flip event. When the user moves away the finger B, which originally contacts the touch panel 10 together with the finger A, the contact point of the touch panel 10 will become a single-point touch (that is, the first touch position 11 continuously locates at the touch panel 10 and the second touch position 12 disappears) from the originally two-point touch (including the first touch position 11 corresponding to the finger A and the second touch position 12 corresponding to the finger B). At that time, the touch panel 10 detects whether the first touch event is generated within the first active area 20 or not. The user can use the finger B, which has moved away, to re-contact the touch panel 10 at a touch position 21 to allow the touch panel 10 to receive the first touch event at the touch position 21. If the touch position 21, where the first touch event locates, is located within the first active area 20, the touch panel 10 will display the first page flip event. It needs to illustrate herein that the touch position 21 in FIG. 3 is capable of being any coordinate within the first active area 20 and is not limited to the coordinate shown in FIG. 3.

In the method for showing page flip effect of the touch panel 100 as shown in FIGS. 1~3, the first active area 20 corresponding to the first touch position 11 and the second active area 30 corresponding to the second touch position 12 have a real-time tracking function. That is, it supposes that the two fingers A and B of the user, respectively or simultaneously, contact the first touch position 11 and the second touch position 12 on the touch panel 10 at the initial condition. If the user utilizes two fingers or one finger to perform a drag action to cause a movement of the touch position (for example, the first touch position 11 moves in a first distance or/and the second touch position 12 moves in a second distance, in which the first distance and the second distance can be an equal or unequal offset), the coordinate of the first touch position 11 or/and the second touch position 12 will be instantly updated corresponding to the displacement of the touch position. Also, the range of the corresponding first active area 20 or/and the corresponding second active area 30 will be instantly updated with the updated first touch position 11 and second touch position 12. The present invention does not only instantly update the touch position and the active area at the initial condition but also update them during the page flip process. For example, in the process of the first page flip event of FIG. 3, when the user moves the finger B away from the touch panel 10 and utilizes the finger A, which continuously contacts the first touch position 11, to perform a moving action, the first touch position 11 will update its coordinate instantly along with the displacement of the touch position of the finger A and the corresponding first active area 20 will update its range along with the update of the first touch position 11. When the user utilizes the finger B, which has moved away from the touch panel 10, to re-touch the panel 10 to allow the touch panel 10 receiving the first touch event, the touch panel 10 will display the first page flip event as long as the coordinate of the first touch event is located within the updated first active area 20. Similarly, in the process of the second page flip event of FIG. 2, when the user moves the finger A away from the touch panel 10 and utilizes the finger B, which continuously contacts the second touch position 12, to perform a moving action, the second touch position 12 will update its coordinate instantly along with the displacement of the touch position of the finger B and the corresponding second active area 30 will update its range along with the update of the second touch position 12. When the user utilizes the finger A, which has moved away from the touch panel 10, to re-touch the panel 10 to allow the touch panel 10 receiving the second touch event, the touch panel 10 will display the second page flip event as long as the coordinate of the second touch event is located within the updated second active area 30.

That is to say, in the method for showing page flip effect of the touch panel 100 as shown in FIG. 3, the first page flip event means that the user uses the finger B to re-execute a touch operation within the first active area 20 to allow the touch panel 10 to receive the first touch event and the corresponding first page flip event is then executed at the first active area 20 according to the generation of the first touch event. At that time, the finger A keeps touching the first touch position 11 of the touch panel 10. In the method for showing page flip effect of the touch panel 100 as shown in FIG. 2, the second page flip event means that the user uses the finger A to re-execute a touch operation within the second active area 30 to allow the touch panel 10 to receive the second touch event and the corresponding second page flip event is then executed at the second active area 30 according to the generation of the second touch event. At that time, the finger B keeps touching the second touch position 12 of the touch panel 10. However, in the present invention, the first page flip event and the second page flip event can be a downward page flip event (that is, a page flip-down event) and an upward page flip event (that is, a page flip-up event), respectively, or can be an upward page flip event (that is, a page flip-up event) and a downward page flip event (that is, a page flip-down event), respectively. The first touch event and the second touch event are not limited to a single-click event and also comprise a multi-click event or a drag event and so on. The user is capable of choosing any event for use before executing the page flip process for customizing the usage habit of the user.

In another embodiment of the present invention, when the first touch position 11 is located below the second touch position 12, all planar range above the coordinate of the first touch position 11 will be selected as the first active area 20 and all planar range below the coordinate of the second touch position 12 will be selected as the second active area 30. When the first touch event is generated within the first active area, the first page flip event correspondingly executed is the page flip-up event. When the second touch event is generated within the second active area, the second page flip event correspondingly executed is the page flip-down event.

Figure 4:
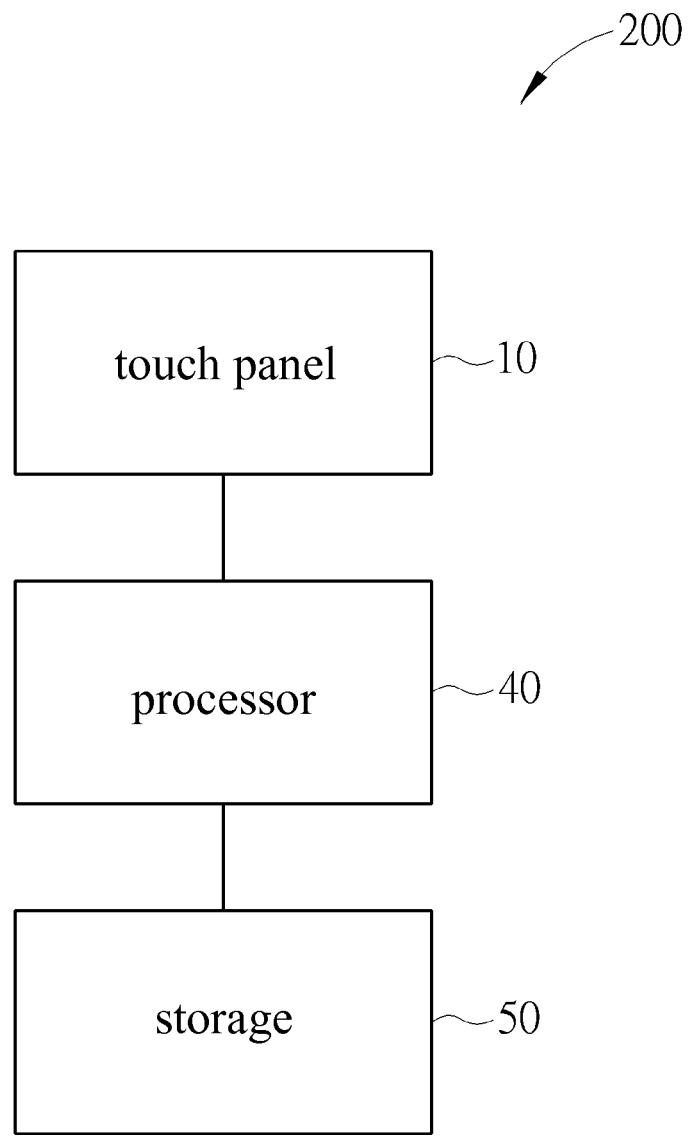
FIG. 4 is a block diagram showing a display device with page flip function according to an embodiment of the present invention.

Please refer to FIG. 4. FIG. 4 is a block diagram showing a display device 200 with page flip function according to an embodiment of the present invention. The display device 200 comprises a touch panel 10, a processor 40 and a storage 50. The touch panel 10 has functions of displaying images and receiving the touch operation. The processor 40 is coupled with the touch panel 10. When the first touch position 11 and the second touch position 12 are generated at the touch panel 10 (as shown in the embodiment of FIGS. 1~3, the user utilizes the finger A and the finger B to correspondingly perform, respectively or simultaneously, the touch operation at the first touch position 11 and the second touch position 12 of the touch panel 10), the two-point event is generated. The first active area 20 is determined on the touch panel 10 according to the first touch position 11, and the second active area 30 is determined on the touch panel 10 according to the second touch position 12. As the embodiment of FIGS. 1~3, when the first touch position 11 is located above the second touch position 12, the location of the first active area 20 at the touch panel 10 is all planar range below the first touch position 11 and the location of the second active area 30 at the touch panel 10 is all planar range above the second touch position 12. Therefore, the present embodiment can refer to the embodiment of FIGS. 1~3. That is, the first active area 20 will comprise the coordinate of the second touch position 12 and the second active area 30 will comprise the coordinate of the first touch position 11. The storage 50 is coupled with the processor 40 for storing the information corresponding to the first page flip event and the second page flip event. In the embodiment described in FIGS. 1~3, the first touch position 11 is located above the second touch position 12. As shown in FIG. 3, when the first touch position 11 is continuously touched, the second touch position 12 disappears and the first active area 20 is re-touched to allow the touch panel 10 to detect the generation of the first touch event, the processor 40 will capture the information of the corresponding first page flip event through the storage 50 according to the first touch event, execute the corresponding first page flip event and display the result of the first page flip event on the touch panel 10. Otherwise, as shown in FIG. 2, when the second touch position 12 is continuously touched, the first touch position 11 disappears and the second active area 30 is re-touched to allow the touch panel 10 to detect the generation of the second touch event, the processor 40 will capture the information of the corresponding second page flip event through the storage 50 according to the second touch event and execute the corresponding second page flip event. However, in the present invention, the first page flip event and the second page flip event can be a downward page flip event (that is, a page flip-down event) and an upward page flip event (that is, a page flip-up event), respectively, or can be an upward page flip event (that is, a page flip-up event)

and a downward page flip event (that is, a page flip-down event), respectively. Furthermore, the first touch event and the second touch event are not limited to a single-click event and also comprise a multi-click event or a drag event and so on. The user can set up the kind of the event for use before executing the page flip process to allow the processor 40 to identify the touch operation.

In another embodiment of the touch display device according to the present invention, when the first touch position is located below the second touch position, all planar range above the coordinate of the first touch position will be selected as the first active area and all planar range below the coordinate of the second touch position will be selected as the second active area. When the touch panel detects that the first touch event is generated at the first active area, the corresponding first page flip event executed by the processor is the page flip-up event. When the touch panel detects that the second touch event is generated at the second active area, the corresponding second page flip event executed by the processor is the page flip-down event.

In addition, the touch display device 200 with page flip function of the present invention also has the real-time tracking function as described in the embodiment of FIGS. 1~3. That is, when the first touch position 11 and the second touch position 12 as shown in FIGS. 1~3 are simultaneously located at the touch panel 10 of the display device 200 and the touch panel 10 detects that the first touch position 11 moves in the first distance at the touch panel 10, the processor 40 will instantly adjust the range and the position of the first active area 20. When the touch panel 10 detects that the second touch position 12 moves in the second distance at the touch panel 10, the processor 40 will instantly adjust the range and the position of the second active area 30.

To sum up, the embodiment of the present invention utilizes the two-point touch of the touch panel to determine the relative position of the touch points. When the upper touch point keeps touching the touch panel, the lower touch point re-touches the touch panel after it departs from the touch panel (disappear) and the touch point, which is re-touched, is located below the upper touch point, the first page flip event is executed. When the lower touch point keeps touching the touch panel, the upper touch point re-touches the touch panel after it departs from the touch panel (disappear) and the touch point, which is re-touched, is located above the lower touch point, the second page flip event is executed. Because the method for showing page flip effect of the touch panel of the present invention does not need to utilize an additional page flip button so as to provide a unified and easy method for showing page flip effect of any application and improve the convenience of browsing and reading for users.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A method for showing page flip effect of a touch panel, comprising:
    detecting a two-point touch event generated at the touch panel for defining a first touch position and a second touch position;
    determining the touch panel into a first active area and a second active area according to a relative position of the first touch position and the second touch position, wherein the first touch position is located within the second active area and the second touch position is located within the first active area, and the first active area and the second active area are distinguishingly separated;
    detecting whether a first touch event is generated within the first active area or not when the first touch position continuously locates at the touch panel by contacting a first touch object with the touch panel and the second touch position disappears by disengaging a second touch object from the touch panel, and executing a corresponding first page flip event at the first active area according to the first touch event; and
    detecting whether a second touch event is generated within the second active area or not when the second touch position continuously locates at the touch panel by contacting the second touch object with the touch panel and the first touch position disappears by disengaging the first touch object from the touch panel, and executing a corresponding second page flip event at the second active area according to the second touch event.

2. The method for showing page flip effect of the touch panel according to claim 1, wherein the first touch event and the second touch event comprise at least one of a single-click event, a multi-click event and a drag event.

3. The method for showing page flip effect of the touch panel according to claim 2, wherein the first page flip event and the second page flip event comprise a page flip-up event and a page flip-down event.

4. The method for showing page flip effect of the touch panel according to claim 3, wherein the first touch position is located above the second touch position.

5. The method for showing page flip effect of the touch panel according to claim 4, wherein a position of the first active area located at the touch panel is below the first touch position and a position of the second active area located at the touch panel is above the second touch position.

6. The method for showing page flip effect of the touch panel according to claim 5, wherein the steps of executing the corresponding first page flip event according to the first touch event generated at the first active area and executing the corresponding second page flip event according to the second touch event generated at the second active area comprise:
    executing the page flip-down event as the corresponding first page flip event when the first touch event is generated at the first active area; and
    executing the page flip-up event as the corresponding second page flip event when the second touch event is generated at the second active area.

7. The method for showing page flip effect of the touch panel according to claim 3, wherein the first touch position is located below the second touch position.

8. The method for showing page flip effect of the touch panel according to claim 7, wherein a position of the second active area located at the touch panel is below the second touch position and a position of the first active area located at the touch panel is above the first touch position.

9. The method for showing page flip effect of the touch panel according to claim 8, wherein the steps of executing the corresponding first page flip event area according to the first touch event generated at the first active and executing the corresponding second page flip event according to the second touch event generated at the second active area comprise:
 executing the page flip-up event as the corresponding first page flip event when the first touch event is generated at the first active area; and
 executing the page flip-down event as the corresponding second page flip event when the second touch event is generated at the second active area.

10. The method for showing page flip effect of the touch panel according to claim 1, further comprising:
 adjusting the first active area correspondingly when the first touch position and the second touch position are both located at the touch panel and the first touch position moves in a first distance at the touch panel; and
 adjusting the second active area correspondingly when the first touch position and the second touch position are both located at the touch panel and the second touch position moves in a second distance at the touch panel.

11. A touch display device with page flip function, comprising:
 a touch panel provided to detect a two-point touch event generated at the touch panel for defining a first touch position and a second touch position, to detect a first touch event and a second touch event generated at the touch panel and to determine the touch panel into a first active area and a second active area according to a relative position of the first touch position and the second touch position, wherein the first touch position is located within the second active area and the second touch position is located within the first active area, and the first active area and the second active area are distinguishingly separated;
 a processor coupled with the touch panel, wherein the touch panel detects whether the first touch event is generated within the first active area or not when the first touch position continuously locates at the touch panel by contacting a first touch object with the touch panel and the second touch position disappears by disengaging a second touch object from the touch panel, and the processor executes a corresponding first page flip event at the first active area according to the first touch event, wherein the touch panel detects whether the second touch event is generated within the second active area or not when the second touch position continuously locates at the touch panel by contacting the second touch object with the touch panel and the first touch position disappears by disengaging the first touch object from the touch panel, and the processor executes a corresponding second page flip event at the second active area according to the second touch event; and
 a storage coupled with the processor and provided for storing the first page flip event and the second page flip event.

12. The touch display device according to claim 11, wherein the first touch event and the second touch event detected by the touch panel comprise at least one of a single-click event, a multi-click event and a drag event.

13. The touch display device according to claim 12, wherein the first page flip event and the second page flip event stored by the storage comprise a page flip-up event and a page flip-down event.

14. The touch display device according to claim 13, wherein the first touch position is located above the second touch position, a position of the first active area located at the touch panel is below the first touch position and a position of the second active area located at the touch panel is above the second touch position, wherein the corresponding first page flip event executed by the processor is the page flip-down event when the touch panel detects that the first touch event is generated at the first active area and the corresponding second page flip event executed by the processor is the page flip-up event when the touch panel detects that the second touch event is generated at the second active area.

15. The touch display device according to claim 13, wherein the first touch position is located below the second touch position, a position of the second active area located at the touch panel is below the second touch position and a position of the first active area located at the touch panel is above the first touch position, wherein the corresponding first page flip event executed by the processor is the page flip-up event when the touch panel detects that the first touch event is generated at the first active area and the corresponding second page flip event executed by the processor is the page flip-down event when the touch panel detects that the second touch event is generated at the second active area.

16. The touch display device according to claim 11, wherein the first touch position and the second touch position are both located at the touch panel, in which the first active area is adjusted correspondingly when the touch panel detects the first touch position moves in a first distance at the touch panel and the second active area is adjusted correspondingly when the touch panel detects the second touch position moves in a second distance at the touch panel.

* * * * *